United States Patent [19]

Belart et al.

[11] Patent Number: 4,627,669
[45] Date of Patent: Dec. 9, 1986

[54] SLIP-CONTROLLED BRAKE SYSTEM FOR AUTOMOTIVE VEHICLES

[75] Inventors: Juan Belart, Walldorf; Lutz Weise, Mainz; Wolfram Seibert, Darmstadt, all of Fed. Rep. of Germany

[73] Assignee: Alfred Teves GmbH, Frankfurt am Main, Fed. Rep. of Germany

[21] Appl. No.: 706,154

[22] Filed: Feb. 27, 1985

[30] Foreign Application Priority Data

Mar. 1, 1984 [DE] Fed. Rep. of Germany ....... 3407537

[51] Int. Cl.⁴ ............................................. B60T 8/44
[52] U.S. Cl. .................................................. 303/114
[58] Field of Search .............. 303/113, 114, 115, 116, 303/119; 188/181 R, 181 A

[56] References Cited

U.S. PATENT DOCUMENTS 3,606,488 9/1971 Beuchle et al. ...................... 303/114
4,340,257 7/1982 Belart .............................. 303/119 X
4,395,072 7/1983 Belart .................................. 303/114
4,492,413 1/1985 Belart et al. ......................... 303/114

Primary Examiner—Duane A. Reger
Assistant Examiner—Robert J. Oberleitner
Attorney, Agent, or Firm—James B. Raden; William J. Michals

[57] ABSTRACT

A slip-controlled brake system for automotive vehicles comprising a braking pressure generator (3) with a power brake booster (2) supplied by an auxiliary pressure source (7), with the booster communicating with the wheel brakes of one axle by way of multi-directional control valves (EV) and acting upon a master cylinder (3) which communicates with the wheel brakes of the other axle. For traction slip control, the working chamber (11) of the master cylinder (3) is connectable to the auxiliary pressure source (7) by way of multi-directional control valves (9, 13).

2 Claims, 1 Drawing Figure

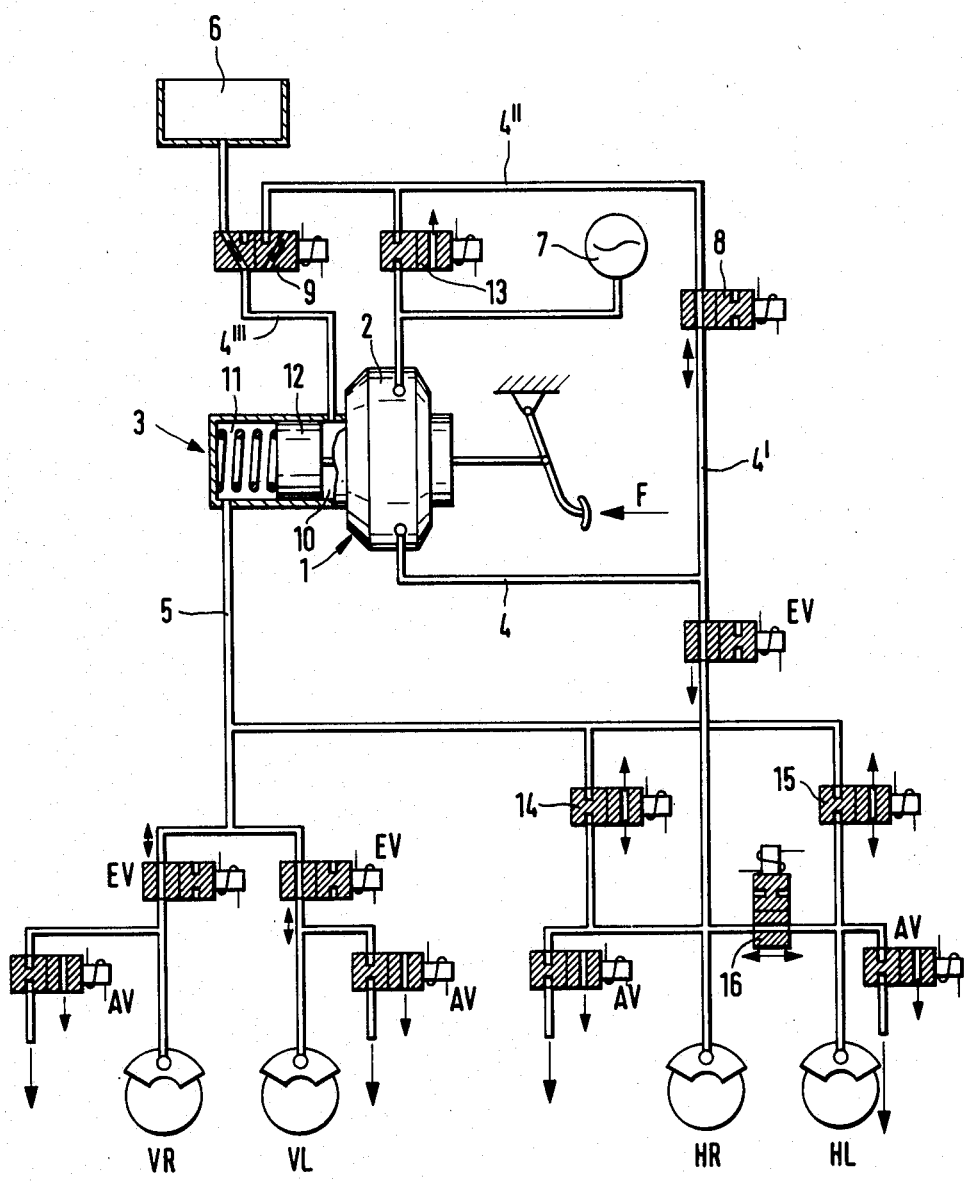

4,627,669

SLIP-CONTROLLED BRAKE SYSTEM FOR AUTOMOTIVE VEHICLES

BACKGROUND OF THE INVENTION

The present invention relates to a slip-controlled brake system provided for automotive vehicles which is equipped with a braking pressure generator comprising a power brake booster supplied by an auxiliary pressure source, to which booster the wheel brakes of one axle are connected by way of multi-directional control valves and which acts upon a master cylinder that is connected to the wheel brakes of the other axle. The working chambers of the booster are connectible by way of directional control valves to the auxiliary pressure source for the purpose of traction slip control.

A brake system with slip control of the type initially referred to is known which brake system does not prevent wheel lock due to a braking pressure being excessive in comparison to the instantaneously possible frictional engagement, but which likewise serves to control traction slip or to confine said to a maximum value. For the purpose of traction slip control, braking pressure out of the auxiliary pressure source will be delivered by way of multi-directional control valves into the master cylinder or into the working chambers of the master cylinder, and from there is supplied further to the wheel brakes of the driven wheels connected to the master cylinder, the inlet valves and outlet valves required for brake slip control reducing this pressure. In this control period, the pressure in the wheel brakes of the driven wheels communicate directly with the power brake booster which remains uninfluenced.

It is an object of the present invention to extend the range of applications of the brake system according to the main patent by entailing minimum effort.

SUMMARY OF THE INVENTION

This object is achieved in that the slip-controlled brake system of the type referred to hereinabove is designed for mounting on a vehicle with driven front and rear axles, and wherein the working chambers of the master cylinder are connected to the wheel brakes of the other axle (to the wheel brakes communicating directly with the power brake booster) by way of individual pressure fluid lines containing multi-directional control valves which normally during a braking action without commencement of slip control are in the closed position and which are switchable to assume the opened position for traction slip control.

According to an embodiment of the present invention, the wheel brakes of an axle connected to the power brake booster are interconnected by a multi-directional control valve which normally (i.e., prior to commencement of slip control and during brake slip control) is switched to the opened position, while being closed during traction slip control. Consequently, during normal braking actions and during brake slip control, the two wheel brakes connected to the power brake booster will be acted upon by the same amount of pressure, while the braking pressure at these two wheels can be adjusted and varied individually in the period of traction slip control.

BRIEF DESCRIPTION OF THE DRAWING

Further features, advantages and varieties of use of this invention are discernible from the following description of further details with reference to the accompanying drawing wherein the single FIGURE schematically illustrates the hydraulic circuit diagram of the inventive brake system.

DETAILED DESCRIPTION

In the embodiment according to this illustration, the brake system comprises a braking pressure generator 1 which is substantially composed of a power brake booster 2 and a master cylinder 3 directly connected and structurally unitized with said booster. The brake force which can be exerted on the braking pressure generator 1 is symbolized by an arrow F.

This arrangement concerns a brake system with two pressure fluid circuits 4, 5 communicating in each case with the wheel brakes of two wheels VR, VL and HR, HL, respectively. Inserted in the pressure fluid conduit to the wheels are inlet valves EV normally switched to the opened position, one individual inlet valves EV each being allocated to the front wheels VR, VL, while one joint inlet valve EV is assigned to the rear wheels HR, HL. For pressure reduction, the embodiment shown arranges for each wheel to dispose of a normally closed outlet valve AV which communicates with a pressure supply reservoir 6 via non-illustrated conduits symbolized by an arrow.

Connected to the inlet of the power brake booster 2 is an auxiliary pressure source 7. The outlet of the power brake booster, at which pressure controlled in dependence upon the pedal actuation is prevailing, is connected to a chamber 10 in the master cylinder 3 via a pressure fluid conduit 4, 4', 4", 4''' which contains a two-way/two-position directional control valve 8 normally being in the opened position, as well as a three-way/two-position directional control valve 9 which is closed in its inactive position. Via a check valve not shown which may for instance be combined with the sleeve of piston 12 in the master cylinder 3, in the event of pressure delivery into the chamber 10, pressure fluid will be supplied in a manner known per se out of the chamber 10 into the working chamber 11 and from there through the pressure fluid line 5 into the wheel brakes of the front wheels VR, VL.

The chamber 10 is via the valve 9 in communication with the pressure supply reservoir 6 during normal braking actions without control. If there is imminent danger of wheel lock, brake slip control will commence, whereby the valve 9 will be energized and switched over so that pressure fluid is permitted to flow from the outlet of the power brake booster 2 via valve 8 and valve 9 to the master cylinder 3.

For traction slip control, the pressure fluid conduit will be closed by valve 8, and the auxiliary pressure source 7 will be connected to the pressure fluid conduit leading to the master cylinder 3 by way of change-over of a two-way/two-position directional control valve 13. After energization of the valve 9, pressure will be available at the outlet of the master cylinder 3 via chamber 10 and working chamber 11, which pressure can be delivered to the front wheels VR, VL via the inlet valves EV, on the one hand, and, on the other hand, to the wheel brakes at the rear wheels HR, HL via the two-way/two-position directional control valves 14 and 15 which are closed in their initial position and which can be changed over for the purpose of traction slip control.

During traction slip control, the two-way/two-position directional control valve 16 likewise will be energized, closes the open passage and thereby enables individual control of the pressure at the rear wheels HR, HL by means of the valves 14 and 15 and the outlet valves AV connected to the rear wheels.

Hence it follows that mounting of additional two-way/two-position directional control valves provides a brake system adapted for all-wheel-driven vehicles, the brake system preventing wheel lock due to excessive high braking torque as well as spinning of the wheels due to a excessive driving torque, while individual control at all wheels is attained in any control period.

What is claimed is:

1. A slip-controlled brake system for automotive vehicles having wheel brakes associated with front and rear axles, said system comprising, in combination:

a braking pressure generator having a master cylinder including at least one working chamber and having a pedal-actuated power brake booster connected to said master cylinder of said pressure generator;

an auxiliary pressure source connected to said brake booster;

a first hydraulic brake circuit connecting said brake booster to the wheels of one axle;

a second hydraulic brake circuit connecting said master cylinder to the wheels of the other axle; and, first valve means for connecting said auxiliary pressure source and said working chamber of said master cylinder of said pressure generator during traction slip control; and, second and third valve means, each connecting said second hydraulic brake circuit to a respective one of said wheels of said one axle during traction slip control.

2. The brake system according to claim 1, including forth valve means connected between the wheels of said one axle, said forth valve means being normally open to permit parallel hydraulic control of said wheels of said one axle, and said forth valve means being open during traction slip control to permit individual control of said wheels of said one axle respectively by said second and third valve means during traction slip control.

* * * * *